Oct. 19, 1965    G. E. DRAZIN    3,212,548
AUTOMOBILE SAFETY WHEEL
Filed June 2, 1964    2 Sheets-Sheet 1
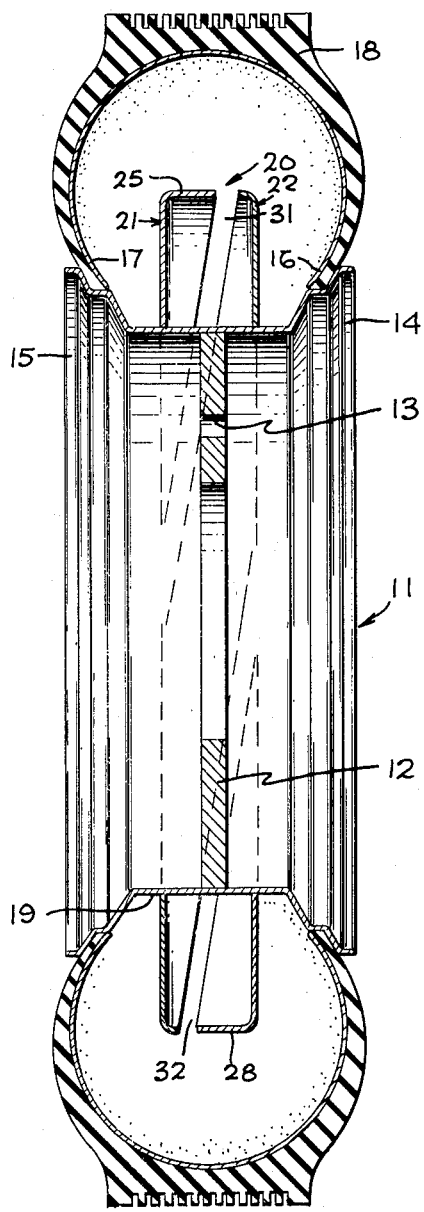
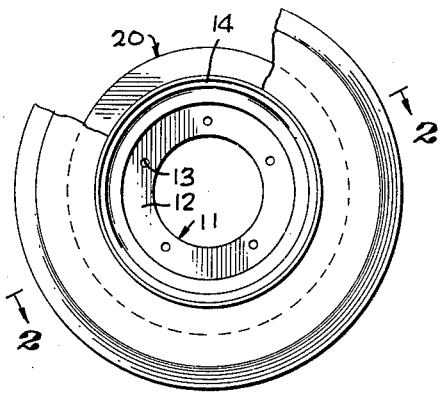
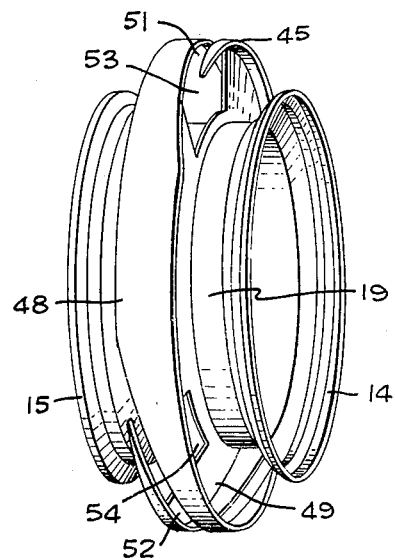
GEORGE E. DRAZIN
INVENTOR.
BY 
ATTORNEY Oct. 19, 1965  G. E. DRAZIN  3,212,548
AUTOMOBILE SAFETY WHEEL
Filed June 2, 1964  2 Sheets-Sheet 2

INVENTOR.
GEORGE E. DRAZIN
BY
ATTORNEY 3,212,548
AUTOMOBILE SAFETY WHEEL
George E. Drazin, 13129 Oxnard, Van Nuys, Calif.
Filed June 2, 1964, Ser. No. 371,936
14 Claims. (Cl. 152—158)

This invention relates to an automotive wheel and more particularly to an improved automotive wheel having a safety rim structure which prevents or minimizes loss of control of the vehicle and damage to the tire in the event of a blow-out or puncture, particularly at high speeds.

Many different arrangements have been suggested for safety wheels which provide a structure inside of the tire to support the weight of the vehicle and prevent collapse of the tire in the event of a puncture or a blow-out, but these devices are extremely complicated and add appreciably to the weight of the vehicle. One class of such wheels is formed in a number of arcuate segments which have to be inserted within the tire after it is mounted over the safety rim, and then assembled and attached to the body of the wheel. This process is time consuming and arduous, since the assembly and attachment must be carried on the inside of the tire and out of sight. Other arrangements employ two or more circular sections which are bolted together to form the complete wheel and rim. With many of these very complex and massive devices, the annular safety ring which supports the tire when it is deflated has such a large diameter that in practice it is very difficult, if not physically impossible, to mount the tire over the safety rim itself.

One previously patented construction would permit a segment of the safety rim to be removed to expose a notch or opening in the safety rim which permits a portion of the rim to be inserted in the tire and the rest of the rim threaded into the interior of the tire. However, after the tire is positioned around the periphery of the wheel disc, it is necessary to insert and interlock the removable segment, a procedure which would be very difficult, if not impossible, after the tire has been inserted or mounted on the wheel, since the inside diameter of the tire is substantially less than the diameter of the outer rim.

The subject invention was conceived in order to, and does, avoid these and other deficiencies which are inherent in existing safety wheels, while satisfying the urgent and long-felt need for a device of this type.

Briefly stated, one preferred embodiment of the present invention consists of an annular ring formed from two separate sections of light weight sheet metal, which may be welded or otherwise secured to the central depressed portion of a conventional wheel structure for automotive vehicles. The two sections of the ring provide a relatively broad and smoothly curved surface around their circumference and also provide two helical slots on opposite sides of the wheel through which the bead of the tire may be threaded to permit fast and easy mounting and demounting of the tire on the rim.

One object of the present invention is to provide a light, durable safety wheel with a central annular ring of enlarged diameter which will permit the vehicle to be driven safely after a blow-out or other accident which deflates the tire, and thereby prevent damage to the tire carcass.

Another object of the invention is to provide a split-ring structure for safety wheels which can be readily attached by welding or other conventional methods to the central or drop center section of an automotive wheel for tubeless tires, which has sufficient strength to support the weight of a vehicle during an emergency when the tire has lost its air pressure.

A still further object is to provide a safety rim structure for an automotive wheel which permits fast and easy mounting and dismounting of a conventional tubeless tire without requiring the assembly and disassembly of a plurality of parts or the insertion and removal of a peripheral section, and yet provides a substantially continuous smooth arcuate surface, which engages the inside of the tread portion of the tire, supporting the weight of the vehicle during emergencies.

Other objects and many of the attendant advantages of the present invention will be apparent from consideration of the following detailed description when taken in conjunction with the accompanying drawings wherein:

FIGURE 1 is a side elevational view with a portion broken away illustrating a conventional tubeless tire mounted on the safety wheel and annular rim of the present invention;

FIGURE 2 is a sectional view taken on the line 2—2 of FIGURE 1;

FIGURE 3 is a pictorial view illustrating another preferred form of the safety wheel and annular ring of the present invention in which the annular ring is supported on the wheel by a single centrally located segmented pedestal;

Figure 4:
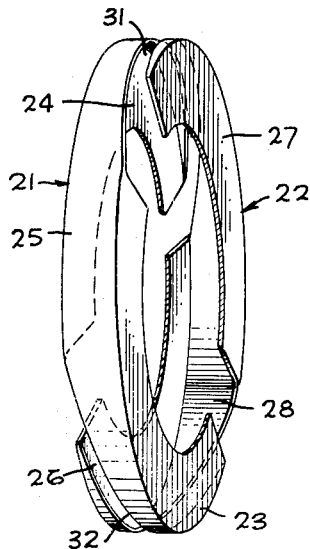
FIGURE 4 is a pictorial view showing the two segments in their cooperative position forming the annular ring before mounting on a conventional drop center wheel for automotive vehicles.
Figure 5:
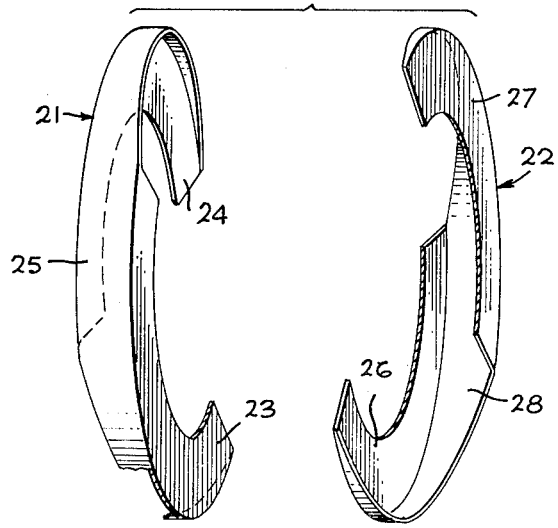
FIGURE 5 is an exploded view of the two segments shown in FIGURE 4.
Figure 6:
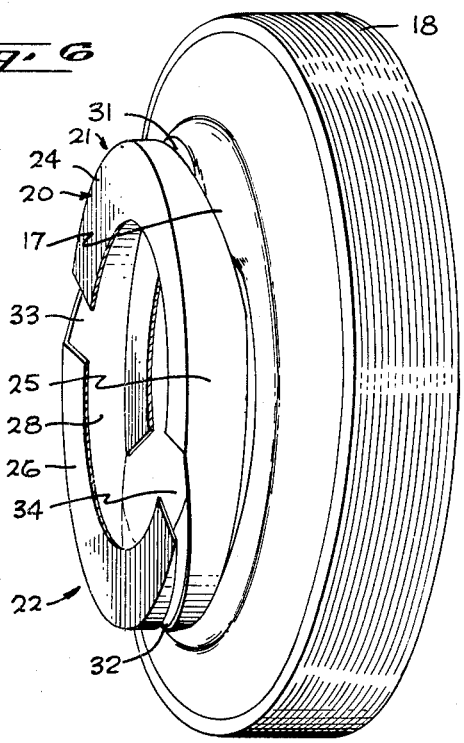
Figure 7:
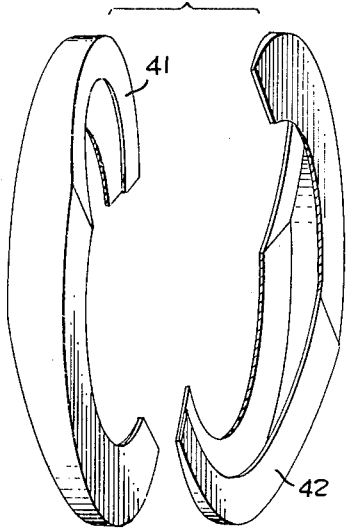

FIGURE 6 is a pictorial view illustrating the manner in which the bead of the tubeless tire would be threaded into the diagonal or helical slot formed between the two adjacent segments of FIGURE 4 with the wheel itself left out for clarity of illustration; and FIGURE 7 is an exploded view of two adjacent segments such as those shown in FIGURE 4 illustrating the optional provision of inwardly extending flanges to facilitate mounting a tire.

Referring now to the drawings and more particularly to FIGURE 1, the safety wheel 11 of the present invention is made in the same manner as a conventional wheel with a disc 12 having a large central opening and a plurality of small openings 13 for the lug bolts used in mounting it on the drum of a conventional vehicle.

This wheel 11 has a conventional outer rim 14 on one side thereof and the opposite rim structure 15, shown in FIGURE 2.

The outer rim portions 14 and 15 are shaped to receive the beads 16 and 17 of a conventional tubeless tire 18 in the usual manner. The conventional automotive wheel 11 also includes a drop center portion 19 to which the wheel disc 12 is rigidly secured.

The unique feature of the present invention is the annular ring 20 which may be built into a wheel during the original manufacturing process or attached as a modification to the conventional drop center rim of any existing wheel. This ring 20 is illustrated in more detail in FIGURES 3 and 4. The ring is constructed in two segments 21 and 22 in order to maintain wheel balance. If desired more than two such segments may be employed without disturbing this balance so long as they are of equal length and weight and are uniformly spaced about the wheel. These segments 21 and 22 may be separately assembled and mounted on the wheel 11 or each of the separate elements may be fabricated and welded together in its proper position on the drop center portion 19 of the wheel.

The segment 21 consists of the two arcuate sectors 23 and 24 which are parallel, or extend in parallel planes radially, with respect to the wheel disc 12 and are staggered with respect to the periphery of the wheel in the central drop center section 19.

The two arcuate sectors 23 and 24 are connected by a hoop-shaped section 25 which is actually a curved portion of a cylinder with the central part having a uniform width and being tapered at both ends.

The segment 22 is similarly formed of the two arcuate sectors 26 and 27 which are connected by the hoop or cylindrical section 28.

It will be quite apparent that the two segments 21 and 22 can be fabricated from pieces made from two basic patterns. One piece may be the arcuate sector, such as 23, 24, 26 and 27, and the other the hoop or ring portion 25 with tapered ends which is identical to the hoop or ring portion 28 of the segment 22.

The basic elements of the segments, such as pieces 23, 24 and 25, can obviously be welded together to form the segments 21 and 22 which in turn can be welded to the wheel 11 around the drop center portion 19; or alternatively, the individual elements, such as 23, 24, 26 and 27 can first be welded to the portion 19 and then the outer hoop portions 25 and 28 can be welded on subsequently.

FIGURE 3 illustrates another form of the subject invention which employs a single centrally located arcuate pedestal 49 to support hoop-shaped segments 45 and 48. Gaps 53 and 54 are provided in pedestal 49 registering with helical slots 51 and 52 in segments 45 and 48 and extending substantially to the drop center 19.

Obviously other conventional methods of construction can be utilized for forming the safety wheel and annular ring of the present invention.

The overlapping tapered ends of the hoop-portions 25 and 28 are spaced from each other to form the helical slots or grooves 31 and 32 extending diagonally at opposite sides of the wheel and annular ring 20. When the tire 18 is first mounted on the safety wheel 11, one of the two beads, such as the bead 17, is threaded into one of the slots such as 31 and the wheel is rotated or threaded until all but a short portion of the bead 17 has entered the slot 31 and rests on the central portion 19 extending out through the gap 33 between the segments 24 and 26. A similar gap is formed on the opposite side of the wheel and either of the slots 31 and 32 may be utilized for starting the bead of the tire onto the rim.

It will be obvious that after the bead 17 has been inserted in the slot 31, until it extends out through the gap 33, a portion of the bead will still lie on the wrong side of the segments 21 and 22. Since the bead is seated deeply in the slot and resting on the drop center portion 19 on one side of the wheel, the remainder of the bead may be forced over the segment 22 by a tire iron bearing against the adjoining edges of the arcuate sector 26. Subsequently, after the bead 17 has been forced over the arcuate sector 26, the remainder of the bead will be forced over the complementary arcuate sector 24, and the bead 17 which is in the slot 31 will be lifted out and over the segment 21 into the deep trough formed between the outer rim 15 and the annular ring 20. This final step in the mounting process may be accomplished easily by rotating the tire relative to the wheel, or vice versa. It will then be a simple matter to force the bead 16 over the other outer rim edge 14 in the customary manner. After mounting the tire may be inflated in the normal manner to force the beads 16 and 17 into the appropriate grooves in the outer rim edges 14 and 15 as shown in FIGURE 2.

The procedure for mounting a tire on the embodiment of the subject invention shown in FIGURE 3 is essentially identical with that just described in connection with the structure illustrated in FIGURES 1, 2, 4, 5, 6 and 7. The gaps 53 and 54 permit the bead 17 to pass from one side of pedestal 49 to the other while the bead is being threaded along slot 51 or 52.

In practice it is highly desirable to round off all the edges where the arcuate sectors are welded or otherwise joined to the hoop or ring sections 25 and 28, and the corners indicated by the numerals 35, 36, 37 and 38 in order to reduce frictional resistance and to provide a cam action against the bead of the tire as the bead is pulled out of slot 31 or 32 and over annular ring 20.

To further facilitate the reduction of friction and increase this cam action, a plurality of inwardly extending flanges such as those shown as 41 and 42 in the detail view of FIGURE 7, may be provided on both sides of the slots 31 and 32. These flanges may be continuous throughout the length of slots 31 and 32, or may take the form of short lips or fillets at the ends of the slots only.

Obviously the annular ring 20 may be made from some lightweight solid material, such as aluminum or foam plastic, with one or two helical slots formed therein. Such a ring could be molded directly on a conventional drop center ring, and possibly covered with a resilient material for strength and a smooth protective surface.

It will be clear from this brief description that many other modifications and variations of the present invention may be made within the scope of the following claims.

What is claimed is:

1. In a safety wheel for tubeless beaded tires including a drop center rim with outer rim portions the improvement comprising:
   a. An annular ring seated and secured in the central drop center section of said rim intermediate said outer rim portions, said ring having a substantially larger diameter than, and extending radially beyond, said outer rim portions; and
   b. At least one helical slot extending diagonally across said ring and adapted for receiving and threading the bead of a tire onto said rim.

2. The improvement described in claim 1 in which said diagonal slot extends substantially to the bottom of said drop center section.

3. The improvement described in claim 1 in which said annular ring is hollow and includes a diagonally slotted outer hoop portion connected to spaced, parallel, arcuate segments, said segments being secured to said drop center portion.

4. The improvement described in claim 3 in which said hoop portion is provided with curved, inwardly directed flanges on both sides of said slot and extending throughout the length thereof.

5. The improvement described in claim 3 in which said hoop portion is provided with inwardly projecting lips on both sides of said slot adjacent the ends thereof.

6. In a safety wheel for tubeless beaded tires including a drop center rim with outer rim portions the improvement comprising:
   a. An annular ring seated and secured in the central drop center section of said rim intermediate said outer rim portions, said ring having a substantially larger diameter than, and extending radially beyond, said outer rim portions; and
   b. A plurality of helical slots extending diagonally across said ring at uniform intervals around its circumference and adapted for receiving and threading the bead of a tire onto said rim.

7. The improvement described in claim 6 in which said slots extend substantially to the bottom of said drop center section.

8. In a safety wheel for tubeless beaded tires including a drop center rim with outer rim portions the improvement comprising:
   a. An annular ring seated and secured in the central drop center section of said rim intermediate said outer rim portions, said ring having a substantially larger diameter than, and extending radially beyond, said outer rim portions; and
   b. At least one helical slot extending diagonally across said ring and adapted for receiving and threading the bead of a tire onto said rim; and
   c. Said annular ring being formed of a diagonally slotted outer hoop portion supported around said drop center portion by a centrally located pedestal, said pedestal having a gap therein registering with said slot.

9. The improvement described in claim 8 in which the gap in said pedestal extends substantially to the bottom of said drop center portion.

10. The improvement described in claim 8 in which said hoop portion is provided with curved, inwardly directed flanges on both sides of said slot and extending substantially throughout the length thereof.

11. The improvement described in claim 8 in which said hoop portion is provided with inwardly projecting lips on both sides of said slot adjacent the ends thereof.

12. In a safety wheel for tubeless beaded tires including a drop center rim with outer rim portions the improvement comprising:
   a. An annular ring seated and secured in the central drop center section of said rim intermediate said outer rim portions, said ring having a substantially larger diameter than, and extending radially beyond, said outer rim portions; and
   b. A plurality of helical slots extending diagonally across said ring at uniform intervals around its circumference and adapted for receiving and threading the bead of a tire onto said rim; and
   c. Said annular ring being formed of a diagonally slotted outer hoop portion supported around said drop center portion by a centrally located pedestal, said pedestal having gaps therein registering with said slots.

13. In a safety wheel for tubeless beaded tires including a drop center rim with outer rim portions, an annular ring seated and secured in the central drop center section of said rim intermediate said outer rim portions, said ring having a substantially larger diameter than, and extending radially beyond, said outer rim portions and having at least one helical slot extending diagonally across said ring, said slot being adapted for receiving and threading the bead of a tire onto said rim, the improvement comprising inwardly projecting flanges on both sides of said slot adapted to apply camming action to force the bead of a tire over said ring during the mounting and demounting process.

14. In a safety wheel for tubeless beaded tires including a drop center rim, having a central annular surface and outer rim portions the improvement comprising:
   a. An annular ring seated and secured on said central annular surface intermediate said outer rim portions, said ring having a substantially larger diameter than, and extending radially beyond, said outer rim portions;
   b. Said annular ring being formed of a plurality of outer hoop portions, each connected to spaced parallel arcuate segments, uniformly staggered with respect to the annular surface of said drop center rim, secured to said drop center section at spaced intervals around its circumference, and extending radially therefrom; and
   c. Said hoop portions being uniformly tapered at both ends to form a plurality of circumferentially spaced diagonal slots across said annular ring between their adjacent overlapping tapered ends.

References Cited by the Examiner
UNITED STATES PATENTS

| | | |
|---|---|---|
| 2,119,520 | 6/38 | Brokering. |
| 3,028,900 | 4/62 | Scott _____ 152—158 |

References Cited by the Applicant
UNITED STATES PATENTS

| | | |
|---|---|---|
| 2,074,284 | 3/37 | Stevenson. |
| 2,241,858 | 5/41 | Hruska. |
| 2,262,780 | 11/41 | Sherwood. |
| 2,844,180 | 7/58 | Omeron. |
| 2,879,821 | 3/59 | De Mayo. |
| 2,986,189 | 5/61 | Lindley. |
| 3,025,898 | 3/62 | Opel. |
| 3,049,162 | 8/62 | Rosenbaum et al. |
| 3,113,604 | 12/63 | Connor. |

ARTHUR L. LA POINT, *Primary Examiner.*